United States Patent
Matsubara et al.

(10) Patent No.: US 7,415,276 B2
(45) Date of Patent: Aug. 19, 2008

(54) PRESENCE MANAGEMENT SERVER AND SYSTEM

(75) Inventors: Daisuke Matsubara, Kodaira (JP); Kazuho Miki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 433 days.

(21) Appl. No.: 11/311,328

(22) Filed: Dec. 20, 2005

(65) Prior Publication Data

US 2006/0189315 A1 Aug. 24, 2006

(30) Foreign Application Priority Data

Feb. 18, 2005 (JP) ............................. 2005-041529

(51) Int. Cl.
*H04Q 7/20* (2006.01)

(52) U.S. Cl. ................. 455/435.3; 455/550.1; 455/445; 370/328; 709/228

(58) Field of Classification Search ............. 455/435.3, 455/550.1, 445; 370/328; 709/228
See application file for complete search history.

(56) References Cited

U.S. PATENT DOCUMENTS

| | | | | |
|---|---|---|---|---|
| 5,559,860 A | * | 9/1996 | Mizikovsky | ................. 455/413 |
| 6,930,984 B1 | * | 8/2005 | Nomura et al. | ............. 370/254 |
| 6,990,489 B2 | * | 1/2006 | Kondo et al. | ................... 707/8 |
| 7,069,308 B2 | * | 6/2006 | Abrams | ...................... 709/218 |
| 2003/0233476 A1 | * | 12/2003 | Henry | ......................... 709/245 |
| 2003/0236895 A1 | * | 12/2003 | Ohkubo et al. | ............. 709/229 |
| 2004/0006602 A1 | * | 1/2004 | Bess et al. | .................. 709/207 |
| 2004/0006629 A1 | * | 1/2004 | Kino et al. | ................... 709/229 |
| 2004/0109145 A1 | | 6/2004 | Nishio et al. | |
| 2005/0018658 A1 | * | 1/2005 | Ikeda et al. | .................. 370/352 |
| 2005/0141686 A1 | * | 6/2005 | Matsunaga et al. | ...... 379/142.01 |
| 2005/0226221 A1 | * | 10/2005 | Fotta et al. | ................... 370/352 |

* cited by examiner

*Primary Examiner*—Danh C Le
(74) *Attorney, Agent, or Firm*—Reed Smith LLP; Stanley P. Fisher, Esq.; Juan Carlos A. Marquez, Esq.

(57) ABSTRACT

A scheme and a device for managing a user state and a plurality of terminal states on a presence server, and for automatically selecting an optimum terminal by using both the user state and the terminal states. Priority degrees which depend on the terminal states are set, then selecting a terminal whose priority degree is the highest of the plurality of terminals. In association therewith, a priority rank which is set depending on the user state is also taken into consideration, thereby selecting a final optimum terminal. The present scheme makes it possible to automatically perform a fine-grained selection of the optimum terminal in which both the terminal states and the user state are taken into consideration.

10 Claims, 9 Drawing Sheets

FIG.3

| USER ID | USER STATE | |
|---------|------------|---|
| A | ON LINE | 207 |
| B | DURING CONVERSATION | |
| C | ON BUSINESS TRIP | |
| D | – | |
| ⋮ | ⋮ | |

| TERMINAL ID | USER ID | IP ADDRESS | TERMINAL TYPE | TERMINAL STATE |
|---|---|---|---|---|
| A | X | 192.168.0.1 | CELLULAR TELEPHONE | WITHIN ZONE |
| B | X | 192.168.0.2 | PC | LEAVES THE DESK |
| C | Y | 192.168.0.3 | PC | ON LINE |
| ⋮ | ⋮ | ⋮ | ⋮ | ⋮ |

| TERMINAL TYPE | TERMINAL STATE | TERMINAL PRIORITY DEGREE |
|---|---|---|
| PC | OFF LINE | × |
| | ON LINE | ○ |
| | DURING CONVERSATION | ○ |
| | LEAVES THE DESK / IS OUT | △ |
| CELLULAR TELEPHONE | OUT OF ZONE / POWER-SUPPLY OFF | × |
| | WITHIN ZONE | ○ |
| | MANNER MODE | △ |
| | DURING CONVERSATION | × |

| DEFAULT TERMINAL PRIORITY RANK |
|---|
| PC > TELEPHONE > CELLULAR TELEPHONE |

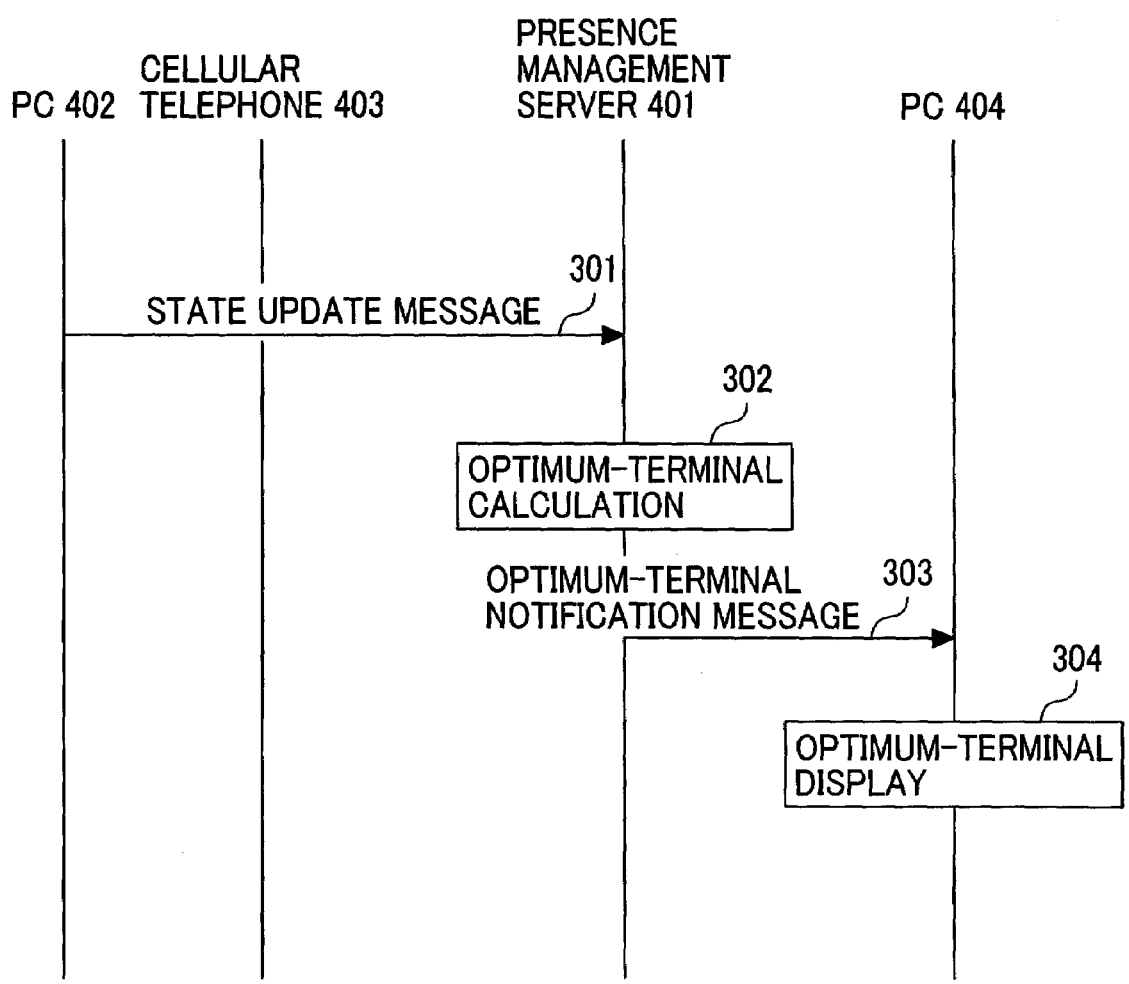

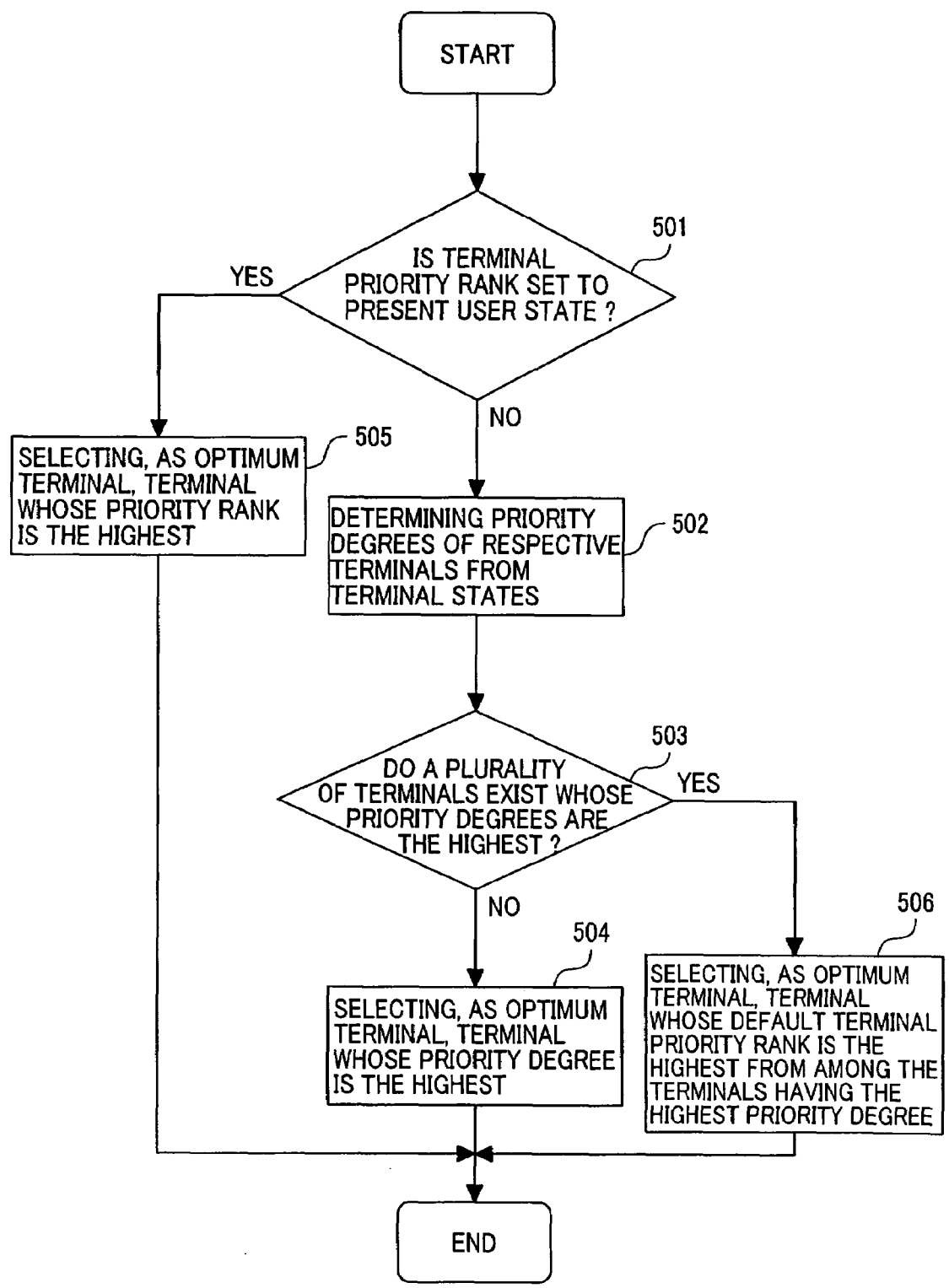

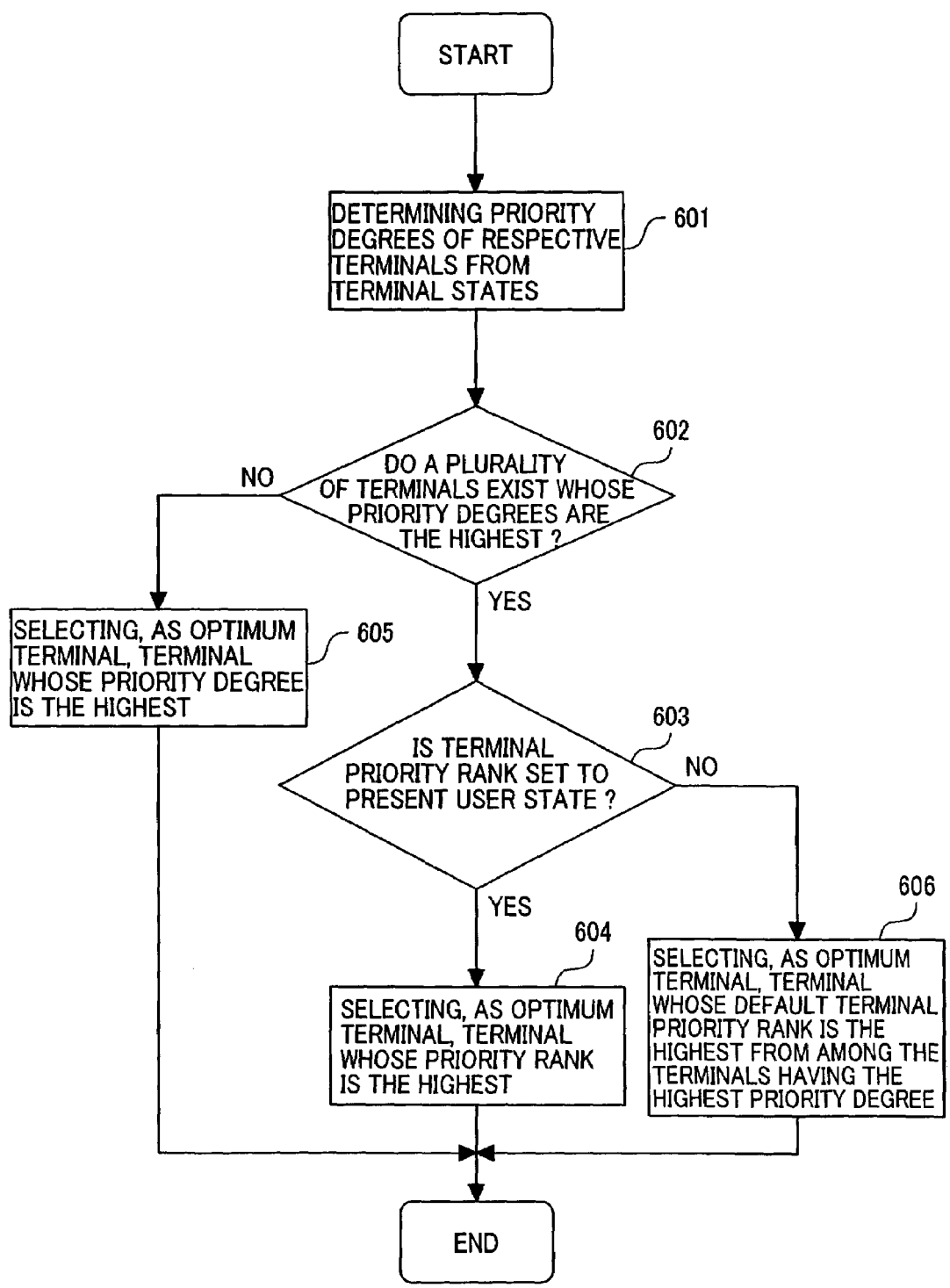

PRESENCE MANAGEMENT SERVER AND SYSTEM

INCORPORATION BY REFERENCE

The present application claims priority from Japanese application JP 2005-041529 filed on Feb. 18, 2005, the content of which is hereby incorporated by reference into this application.

BACKGROUND OF THE INVENTION

1. Field of the Invention

The present invention relates to a communications system and a communications device for calculating and selecting an optimum terminal in correspondence with terminal states.

2. Description of the Related Art

In a conventional communications system, when a user possesses plural terminals, establishing communications with the user has required that an outgoing-message user select an incoming-message terminal from the plural terminals of the incoming-message user. For the outgoing-message user, however, it has been impossible to grasp and ascertain which of the terminals the incoming-message user is using at present, and also at which of the terminals the incoming-message user wishes to receive the incoming message. Accordingly, it has been difficult for the outgoing-message user to select an optimum terminal.

As a technology for eliminating this problem, there exists the selection of an optimum terminal by utilizing user presence. This technology has been disclosed in US 2004/0109145 A1 as an example. In this technology, vacancy/occupation state of a communications unit at each terminal is determined based on the user presence.

SUMMARY OF THE INVENTION

In the above-described technology, part of the user presence includes such a state as will be automatically set, e.g., "during conversation". Most of the user presence, however, is required to be manually set by the user. This makes the operation complicated when there occurs a frequent modification of the setting. Also, in the above-described technology, when the user neglects to modify the setting of the user presence, the situation of the terminals changes with a lapse of time. This has made it impossible for the outgoing-message user to select the optimum terminal.

In the present invention, in a network system including plural client devices and a presence management server device, the following communications system is implemented: The plural client devices and the presence management server device perform communications with each other via the network. Next, the plural client devices notify one or plural terminal state or states to the presence management server. Moreover, the presence management server selects an optimum terminal on the basis of the one or plural terminal state or states.

The optimum terminal is automatically calculated based on the terminal states of the plural terminals. This allows the calculation of the optimum terminal to be performed in the presence management server without the user's updating the user state.

BRIEF DESCRIPTION OF THE DRAWINGS

FIG. 3 is a diagram for illustrating the configuration of a terminal-state management table in the device in FIG. 2;

FIG. 4 is a diagram for illustrating the configuration of a user-state management table in the device in FIG. 2;

FIG. 6 is a diagram for illustrating the configuration of a priority-degree management table in the device in FIG. 2;

FIG. 7 is a diagram for illustrating the configuration of a default priority-rank management table in the device in FIG. 2;

FIG. 8 is a diagram for illustrating a sequence in the system in FIG. 1;

FIG. 9 is a processing flow diagram for illustrating an algorithm for the optimum-terminal calculation in the device in FIG. 2; and FIG. 10 is a processing flow diagram for illustrating an algorithm for the optimum-terminal calculation in the device in FIG. 2.

DETAILED DESCRIPTION OF THE INVENTION

Figure 1:
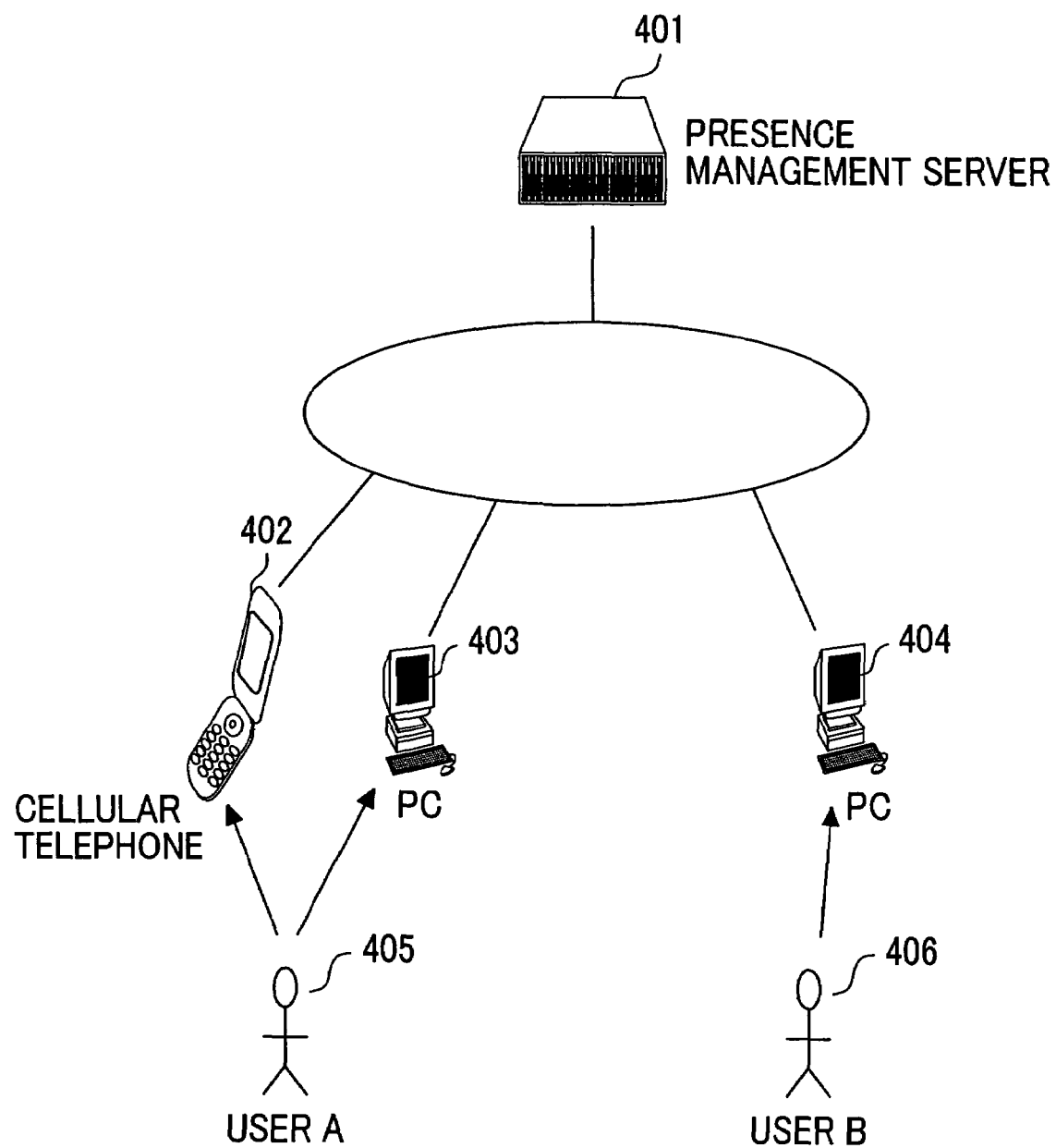
FIG. 1 is a diagram for illustrating the entire configuration of a system according to the present invention.

Hereinafter, referring to embodiments illustrated in the drawings, the more detailed explanation will be given below concerning a data processing device according to the present invention.

FIG. 1 is a configuration diagram of a communications system according to an embodiment of the present invention. In the communications system, plural client devices 402, 403, and 404 and a presence management server 401 are connected to each other by a network, and perform exchanges of messages via the network. The terminal type of the client devices 402 and 404 are personal computers (which, hereinafter, will be referred to as "PC"), and the terminal type of the client device 403 is a cellular-telephone terminal. The client devices 402 and 403 are devices that a user A 405 possesses, while the client device 404 is a device that a user B 406 possesses.

Figure 2:
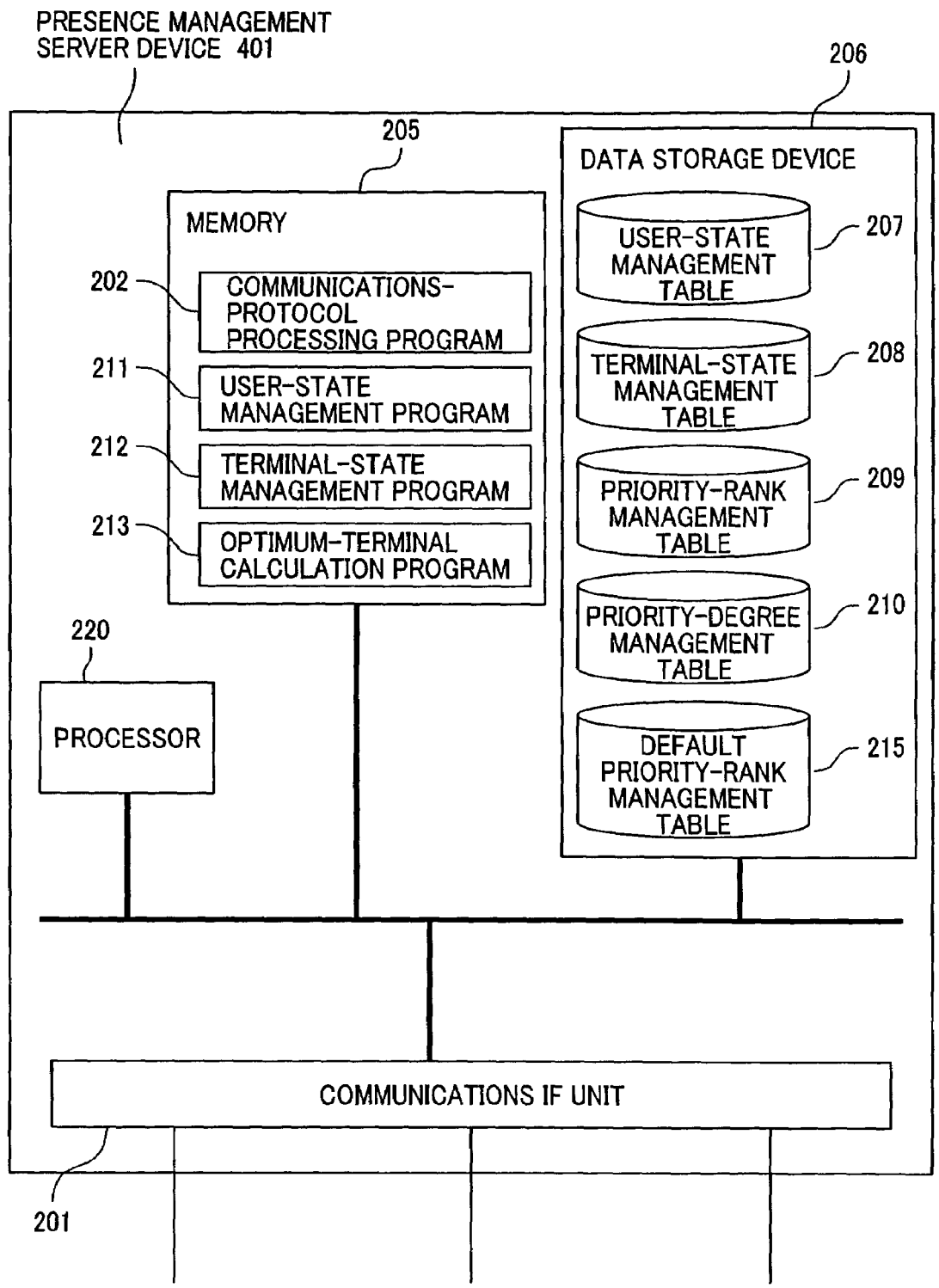
FIG. 2 is a block diagram for illustrating the internal configuration of a presence management server device in the system in FIG. 1.

FIG. 2 is a diagram for illustrating an embodiment of the internal configuration of the presence management server device 401. The present device includes, as physical configuration blocks, a communications IF (:interface) unit 201, a processor 220, a memory 205, and a data storage device 206. The memory 205 stores therein a communications-protocol processing program 202, a user-state management program 211, a terminal-state management program 212, and an optimum-terminal calculation program 213. The respective programs are executed under the management of the processor 220. The data storage device 206 saves therein a user-state management table 207, a terminal-state management table 208, a priority-rank management table 209, a priority-degree management table 210, and a default priority-rank management table 215.

FIG. 3 is an example of the user-state management table 207. The above-described table 207 includes user ID and user state at present. The user state, which indicates the state of a user himself or herself, includes items such as "on line", "during conversation", "on business trip", and "–(no setting)". The "on line" and "during conversation" are manually set by the user or automatically set by the system, if, of terminals that the user possesses, at least one terminal is on line or during conversation. The "on business trip" is manually set by the user on a terminal. The "–(no setting)" is set if there exists none of the automatic setting by the system and the manual setting by the user.

FIG. 4 is an example of the terminal-state management table 208. The above-described table 208 includes terminal ID for uniquely managing a terminal within the system, the user ID of a user who possesses the terminal or terminals, IP address allocated to the terminal, terminal type, and terminal states at present. As the terminal type, there exist terminal types such as PC, cellular telephone, fixed telephone, and PDA. Also, the terminal states differ depending on the terminal type. As an example, in the case of the PC, there exist terminal states such as "on line", "off line", "at the desk", "leaves the desk", and "out". As a switching method for the terminal states such as "at the desk", "leaves the desk", and "out", as an example, there exists length of a time which has elapsed since the user performed a keyboard input last. Also, as the terminal states of a cellular telephone, there exist terminal states such as "within zone", "out of zone", "manner mode", and "during conversation". These terminal states are also automatically detected by the cellular telephone or a base station.

Figure 5:
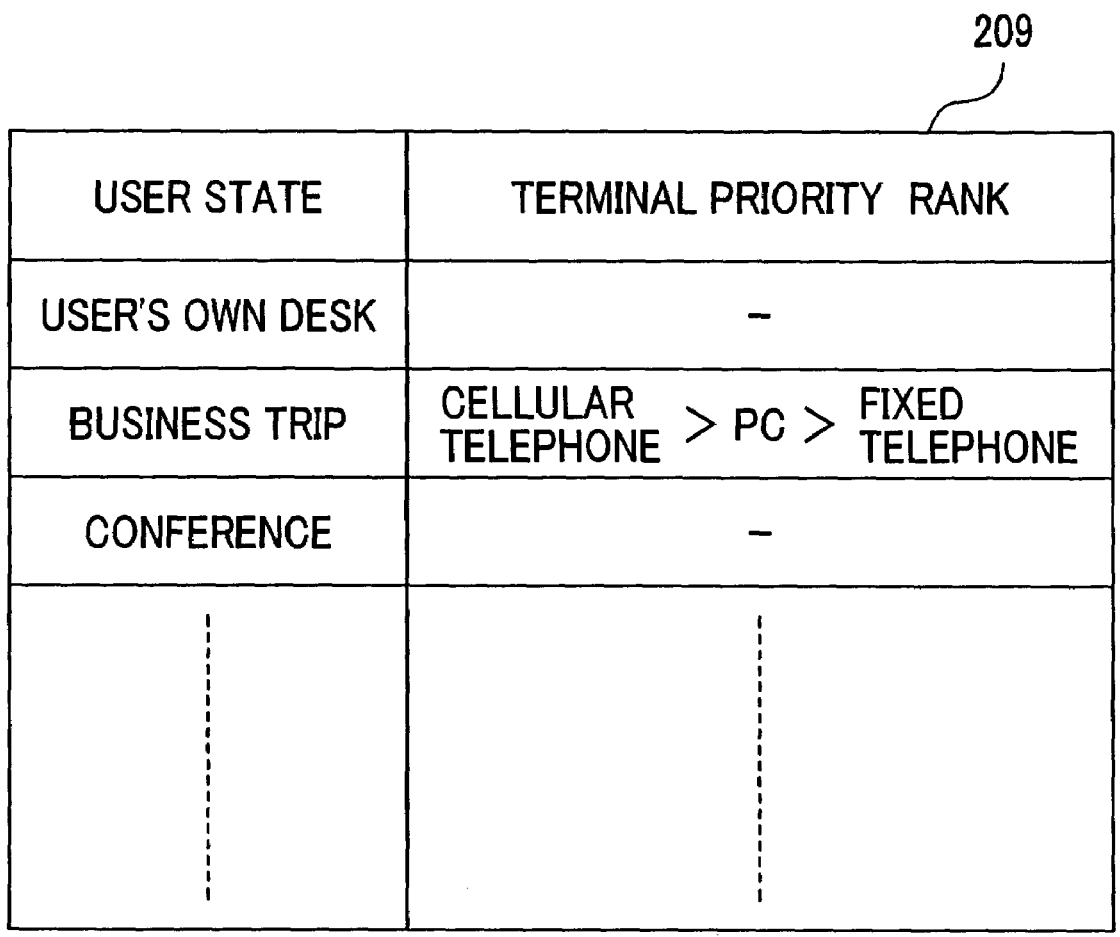
FIG. 5 is a diagram for illustrating the configuration of a priority-rank management table in the device in FIG. 2.

FIG. 5 is the priority-rank management table 209 for specifying a terminal priority rank with respect to the user state. The terminal priority rank indicates a priority rank among terminals as an optimum terminal. The above-described table is set by a system administrator or the user. The above-described table is set on each system basis, or on each user basis. The table as is illustrated in FIG. 5 indicates the following specification: Namely, if the user is at the user's own desk, or attends a conference at present, no priority rank exists among the terminals to be used. If, however, the user is on a business trip at present, the cellular telephone should be used with the highest priority.

FIG. 6 is the priority-degree management table 210 for specifying terminal priority degrees with respect to the terminal states. The terminal priority degrees, which indicate priority degrees of the terminals as the optimum terminal, include degrees such as "high (○)", "middle (Δ)", and "low (x)". The above-described table is set by the system administrator or the user. The above-described table is set on each terminal-type basis, or on each terminal basis. The table in FIG. 6 indicates that, as an example, the PC will be used with the highest priority on line or during a conversation on the telephone.

FIG. 7 is the default priority-rank management table 215 for specifying a default terminal priority rank with respect to the terminal states. The default terminal priority rank is a priority rank to which the system will make reference if the system finds it impossible to identify the optimum terminal from the user state and the terminal states, or if the system has failed to identify the optimum terminal therefrom. The above-described table is set by the system administrator or the user. The above-described table is set on each system basis, or on each user basis. In the case in FIG. 7, if it has been found unsuccessful to identify the optimum terminal, the PC will be specified as the default.

FIG. 8 illustrates a sequence example in the case of notifying an optimum terminal of the user A to the terminal of the user B. At a step 301, the terminal 402 transmits, to the presence management server 401, a state update message which writes therein update information on either or both of the user state and the terminal states. The update information on the user state and the update information on the terminal states are respectively transmitted to the user-state management program 211 and the terminal-state management program 212 via the communications IF unit 201 and the communications-protocol processing program 202. The user-state management program 211, via a data input/output control unit 204, updates the user state of the user in the user-state management table 207. Also, the terminal-state management program 212, via the data input/output control unit 204, updates the terminal states of the terminals in the terminal-state management table 208.

If the user-state management table 207 or the terminal-state management table 208 has been updated, at a step 302, based on a combination of the user state and the terminal states updated, the optimum-terminal calculation program 213 calculates an optimum terminal of the user in accordance with an algorithm which will be described later. After the optimum terminal has been calculated, at a step 303, the optimum-terminal calculation program 213 notifies the terminal 404 of an optimum-terminal notification message which writes therein the optimum-terminal information. This notification is performed via the communications-protocol processing program 202 and the communications IF unit 201. Finally, at a step 304, the terminal 404 displays the notified optimum terminal on a display screen provided in the terminal via a user interface.

FIG. 9 illustrates an example of the algorithm to be used in the calculation of the optimum terminal at the step 302. At a step 501, the optimum-terminal calculation program 213 makes reference to the priority-rank management table 209, thereby confirming whether or not a terminal priority rank has been set to the present user state stored in the user-state management table 207. If the terminal priority rank has been set thereto, the calculation program proceeds to a step 505. Here, the program selects, as an optimum terminal, a terminal whose priority rank has been set to be the highest in the priority-rank management table 209. Meanwhile, if no terminal priority rank has been set thereto, the program proceeds to a step 502. Here, from the terminal-state management table 208, the program makes reference to terminal states of all the terminals that the user A possesses. Then, from the priority-degree management table 210, depending on the terminal states of the respective terminals, the program determines priority degrees of the respective terminals. Next, at a step 503, the program makes reference to the relationship between the priority degrees and the respective terminals determined at the step 502, thereby confirming whether or not a plurality of terminals exist whose priority degrees are the highest of all the terminals of the user A. If a plurality of such terminals exist, the program proceeds to a step 506. Meanwhile, if only one such terminal exists, the program proceeds to a step 504. At the step 504, the program selects, as the optimum terminal, the only one terminal whose priority degree is the highest. Meanwhile, at the step 506, the program makes reference to the default priority-rank management table 215, thereby selecting a terminal whose default terminal priority rank is the highest from among the terminals having the highest priority degree.

As a result of this algorithm, if the terminal priority rank which depends on the user state has been set, the optimum terminal will be selected in accordance with this terminal priority rank. Meanwhile, if no terminal priority rank has been set, the optimum terminal will be selected in accordance with the terminal priority degrees which depend on the terminal states.

FIG. 10 illustrates an alternative algorithm to be used in the calculation of the optimum terminal at the step 302. At a step 601, from the terminal-state management table 208, the optimum-terminal calculation program 213 makes reference to terminal states of all the terminals that the user A possesses. Then, the program determines priority degrees of the respective terminals from the priority-degree management table 210. Next, at a step 602, the program confirms whether or not a plurality of terminals exist whose priority degrees are the highest of all the terminals of the user A. If a plurality of such terminals exist, the program proceeds to a step 603. Meanwhile, if only one such terminal exists, the program proceeds to a step 605. At the step 605, the program selects, as an optimum terminal, the only one terminal whose priority degree is the highest. At the step 603, the program makes reference to the priority-rank management table 209, thereby confirming whether or not a terminal priority rank has been set to the present user state. If the terminal priority rank has been set thereto, the program proceeds to a step 604. Meanwhile, if no terminal priority rank has been set thereto, the program proceeds to a step 606. At the step 604, the program makes reference to the priority-rank management table 209, thereby selecting, as the optimum terminal, a terminal whose priority rank has been set to be the highest from among the terminals having the highest priority degree. At the step 606, the program makes reference to the default priority-rank management table 215, thereby selecting a terminal whose default terminal priority rank is the highest from among the terminals having the highest priority degree.

As a result of this alternative algorithm, the optimum terminal will be selected in accordance with the terminal priority degrees which depend on the terminal states. If no optimum terminal has been determined by the terminal priority degrees, the optimum terminal will be selected in accordance with the terminal priority rank which depends on the user state. If no terminal priority rank has been set, the optimum terminal will be selected in accordance with the default terminal priority rank.

According to the present invention, an optimum terminal is automatically calculated based on terminal states of the plural terminals. This allows calculation of the optimum terminal to be performed in the presence management server without the user's updating the user state.

Moreover, it is possible to select the optimum terminal by combining the user state with the terminal states. This makes it possible to provide fine-grained presence information. Concretely, it is possible to select a more communications-suitable terminal or an actually communication-capable terminal. On account of this, the user, who watches the presence information, finds it possible to prevent the user himself or herself from transmitting a connection request in such a manner that the user has selected a terminal which the communications partner does not actually wish to use for the communications, or a communication-incapable terminal. Namely, it becomes possible to enhance a reliability of the presence information, and also to enhance an easy-to-use property seen from the user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A presence management system comprising:
a plurality of terminals corresponding to one user ID,
another terminal corresponding to another user ID and connected to said plurality of terminals via a network, and
a presence management server connected to said plurality of terminals and another terminal, wherein
said presence management server includes
a reception unit for receiving data from said plurality of terminals, said data indicating respective terminal states of said plurality of terminals,
a selection unit for selecting an optimum terminal on the basis of said respective terminal states of said plurality of terminals, said optimum terminal being associated with said user ID, and
a transmission unit for notifying said optimum terminal to another terminal, said optimum terminal being selected by said selection unit.

2. The presence management system according to claim 1, wherein
said reception unit of said presence management server receives a user state of a user from at least any one of said plurality of terminals, said user having said user ID,
said selection unit selecting said optimum terminal on the basis of said respective terminal states and said user state.

3. The presence management system according to claim 2, wherein
said selection unit of said presence management server comprises a data storage device and a processor,
said data storage device storing therein
a user-state management table for storing said user state,
a terminal-state management table for storing said respective terminal states,
a priority-rank management table for managing a communications priority rank of said terminals which depends on said user state, and
a priority-degree management table for managing communications priority degrees of said terminals which depend on said respective terminal states,
said processor calculating said optimum terminal on the basis of said information stored in said respective tables.

4. The presence management system according to claim 3, wherein
said selection unit of said presence management server further comprises a default priority-rank management table for managing a default terminal priority rank.

5. The presence management system according to claim 4, wherein,
if there exist a plurality of terminals whose priority degrees are the highest, said selection unit selects said optimum terminal on the basis of said default priority-rank management table.

6. The presence management system according to claim 2, wherein
said selection unit of said presence management server includes a data storage device, and,
if said data storage device stores therein a communications priority rank of said plurality of terminals which depends on said user state, said selection unit selects said optimum terminal on the basis of said communications priority rank regardless of said respective terminal states.

7. The presence management system according to claim 2, wherein
said selection unit of said presence management server includes a data storage device and a processor,
if there exist a plurality of terminals whose communications priority degrees are the highest, said communications priority degrees being determined on the basis of said respective terminal states, and if said data storage device stores therein a terminal priority rank which depends on said user state,
said processor selecting said optimum terminal on the basis of said terminal priority rank from among said terminals whose communications priority degrees are the highest.

8. The presence management system according to claim 1, wherein said selection unit determines priority degrees of said respective terminals on the basis of said respective terminal states, said selection unit then selecting, as said optimum terminal, a terminal whose priority degree is the highest.

9. A presence management server connected to a plurality of terminals and another terminal, said plurality of terminals corresponding to one user ID, said presence management server comprising:

a transmission/reception unit for receiving data from said plurality of terminals, and receiving a user state of a user from at least any one of said plurality of terminals, said data indicating respective terminal states of said plurality of terminals, said user having said user ID, and a processor for selecting a communications optimum terminal on the basis of said respective terminal states and said user state, said communications optimum terminal being associated with said user ID, wherein said communications optimum terminal is notified to another terminal via said transmission/reception unit.

10. The presence management server according to claim 9, further comprising a data storage device, said data storage device storing therein a user-state management table for managing said user state, a terminal-state management table for managing said respective terminal states, a priority-rank management table for managing a communications priority rank of said terminals which depends on said user state, and a priority-degree management table for managing communications priority degrees of said terminals which depend on said respective terminal states, said processor calculating said optimum terminal on the basis of said information stored in said respective tables.

* * * * *